United States Patent
Urdl et al.

(10) Patent No.: US 11,577,602 B2
(45) Date of Patent: Feb. 14, 2023

(54) TANK DEVICE FOR A MOTOR VEHICLE

(71) Applicant: MAGNA Energy Storage Systems GesmbH, Sinabelkirchen (AT)

(72) Inventors: Christian Urdl, Hitzendorf (AT); Florian Wimmer, Riegersburg (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 0 days.

(21) Appl. No.: 17/463,709

(22) Filed: Sep. 1, 2021

(65) Prior Publication Data

US 2022/0126680 A1   Apr. 28, 2022

(30) Foreign Application Priority Data

Oct. 23, 2020 (EP) ................................ 20203502

(51) Int. Cl.
   *B60K 15/03*   (2006.01)
(52) U.S. Cl.
   CPC .... *B60K 15/03* (2013.01); *B60K 2015/03217* (2013.01)
(58) Field of Classification Search
   CPC ........... B60K 2015/03217; G01F 23/36; G01F 23/76; G01F 23/32; G01F 23/30; F02M 37/04; F02M 37/0076
   USPC ........................................ 123/495, 497, 509
   See application file for complete search history.

(56) References Cited

U.S. PATENT DOCUMENTS

| | | | | |
|---|---|---|---|---|
| 1,390,892 A | * | 9/1921 | Eimke | B41F 31/022 73/322.5 |
| 2,508,290 A | * | 5/1950 | Poetsch | G01F 23/36 338/33 |
| 3,079,125 A | * | 2/1963 | Tischler | F16K 31/20 137/391 |
| 3,381,709 A | * | 5/1968 | Pregno | B67D 7/062 137/578 |
| 4,184,370 A | * | 1/1980 | Schlick | G01F 23/36 338/33 |
| 4,220,047 A | * | 9/1980 | Mauboussin | G01F 23/36 73/317 |
| 4,845,986 A | * | 7/1989 | Hayashi | G01F 23/72 73/290 R |
| 4,886,089 A | * | 12/1989 | Gabrlik | B60K 15/03519 137/44 |
| 5,004,002 A | * | 4/1991 | Kobayashi | B60K 15/03519 137/39 |
| 5,172,714 A | * | 12/1992 | Kobayashi | F16K 24/042 137/39 |

(Continued)

FOREIGN PATENT DOCUMENTS

DE    69318657 T2    10/1998
DE    102007026146 A1   12/2007
(Continued)

*Primary Examiner* — Sizo B Vilakazi
*Assistant Examiner* — Brian R Kirby
(74) *Attorney, Agent, or Firm* — Jordan IP Law, LLC; Todd A. Vaughn

(57) ABSTRACT

A tank device for a motor vehicle includes a tank container defined by a tank wall having at least one stop region, and at least one lever sensor arranged in the interior of the tank container. The at least one stop region is an end stop for the lever sensor to prevent adhesion of the lever sensor to the tank wall.

12 Claims, 2 Drawing Sheets

(56) References Cited

U.S. PATENT DOCUMENTS

| | | | | | |
|---|---|---|---|---|---|
| 5,267,475 | A | * | 12/1993 | Gaston | B60K 15/061 338/92 |
| 5,814,213 | A | * | 9/1998 | Glasgow | B01D 17/0214 210/232 |
| 6,000,913 | A | * | 12/1999 | Chung | B60K 15/077 417/423.15 |
| 6,230,690 | B1 | * | 5/2001 | Umetsu | B60K 15/077 123/509 |
| 7,032,610 | B2 | * | 4/2006 | Matsuo | F16K 24/042 137/202 |
| 7,418,975 | B2 | * | 9/2008 | Nojiri | F16K 24/044 137/202 |
| 7,458,261 | B2 | * | 12/2008 | Miyagawa | G01F 23/38 73/317 |
| 7,484,409 | B2 | * | 2/2009 | Dykstra | G01F 23/703 73/307 |
| 7,555,946 | B2 | * | 7/2009 | Sawert | G01F 23/36 73/317 |
| 9,062,563 | B2 | * | 6/2015 | Varanasi | F23R 3/002 |
| 9,770,979 | B2 | * | 9/2017 | Cragel | B60K 15/03177 |
| 10,865,750 | B2 | * | 12/2020 | Soreo | B01D 35/0273 |
| 2002/0046770 | A1 | * | 4/2002 | Hattori | B60K 15/03519 137/202 |
| 2002/0157706 | A1 | * | 10/2002 | Bergsma | F02M 25/0836 137/202 |
| 2004/0003843 | A1 | * | 1/2004 | Sugiyama | F16K 24/044 137/202 |
| 2006/0090552 | A1 | * | 5/2006 | Ziegler | F02D 29/06 73/114.54 |
| 2008/0168837 | A1 | * | 7/2008 | Okada | G01F 23/363 73/317 |
| 2009/0071512 | A1 | * | 3/2009 | Lee | G01F 23/38 134/115 R |
| 2009/0101370 | A1 | * | 4/2009 | Tasovski | B60P 1/286 172/1 |
| 2009/0139326 | A1 | * | 6/2009 | Kanahara | B01L 3/00 73/305 |
| 2015/0328981 | A1 | * | 11/2015 | Cragel | B60K 15/03 220/563 |
| 2017/0307432 | A1 | * | 10/2017 | Fuller | G01F 1/38 |
| 2017/0356408 | A1 | * | 12/2017 | Yang | G01L 5/0052 |
| 2018/0143065 | A1 | * | 5/2018 | Klimesch | G01F 23/30 |

FOREIGN PATENT DOCUMENTS

| | | | | |
|---|---|---|---|---|
| DE | 102008045539 | A1 | | 3/2009 |
| DE | 112012005441 | B4 | | 7/2020 |
| FR | 3069320 | A1 | * | 1/2019 ............ B60K 15/03 |
| KR | 20130026635 | A | | 3/2013 |
| WO | WO-2006104076 | A1 | * | 10/2006 ................ B01L 3/00 |
| WO | WO-2021085122 | A1 | * | 5/2021 ............ B60K 15/03 |

* cited by examiner

TANK DEVICE FOR A MOTOR VEHICLE

CROSS-REFERENCE TO RELATED APPLICATIONS

The present application claims priority under 35 U.S.C. § 119 to European Patent Publication No. EP 20203502.8 (filed on Oct. 23, 2020), which is hereby incorporated by reference in its complete entirety.

TECHNICAL FIELD

One or more embodiments relate to a tank device for a motor vehicle, for example, a fuel tank for a motor vehicle.

BACKGROUND

It is known that tanks in motor vehicles, such as fuel tanks, can have one or more "lever sensors" in the interior of the tank container. A lever sensor has a lever arm, with a free end, which can move "freely" to an extent limited by the lever arm. At the free end, it is possible, for example, to arrange a float which can float on the surface of a liquid in the tank, e.g., a fuel. At the end of the lever arm opposite the free end, the lever sensor can be secured and the position of the lever arm can be read out. Such a lever sensor can be used, in particular, to detect the current filling level of a tank, and is then also referred to as a "tank sensor."

End stops are usually also provided for lever sensors in tanks. An end stop for a lever sensor is a component which is usually secured on the tank wall and which forms a defined end stop for the lever sensor. The component for the end stop is usually also formed with a surface which prevents unwanted adhesion of the lever sensor to the end stop component.

SUMMARY

In accordance with one or more embodiments, a tank device for a motor vehicle that can be constructed in a simple and low-cost manner and at the same time makes reliable functioning of the lever sensor possible. The tank device comprises a lever sensor arranged in the interior of a tank container.

In accordance with one or more embodiments, a tank device for a motor vehicle comprising a tank container which is formed by a tank wall having at least one tank stop region, and at least one lever sensor arranged in the interior of the tank container, wherein the at least one stop region is structured to act as an end stop of the lever sensor to prevent adhesion of the lever sensor to the stop region of the tank wall.

In accordance with one or more embodiments, a lever sensor is used in the interior of a tank container, while no separate component is used as the end stop for the lever sensor, the wall of the tank container itself instead being structured in such a way that it acts as a reliable end stop for the lever sensor. The wall of the tank container is therefore formed as a stop zone in a region which is provided for the purpose of acting as an end stop, the "stop region." In this stop region, the tank wall is therefore specially shaped to prevent adhesion of the end of the lever sensor, for example, of a float. A separate component, which would form the stop, can therefore be dispensed with and also does not have to be secured on the tank wall in a complicated manner.

In accordance with one or more embodiments, the stop region is a limited zone around the intended impact point or the intended impact surface of the end region of the lever sensor. If a plurality of lever sensors is provided in the tank, there is preferably in each case one stop region for each lever sensor, the stop region being designed as described. The tank wall outside the stop regions is structured differently than in the stop region(s), with the result that adhesion of the lever sensor to the tank wall would not be prevented or would be prevented to a lesser extent there. In particular, the inside surface of the tank wall can be structured to be smooth and/or flat outside the stop regions.

In accordance with one or more embodiments, at an end region, the lever sensor can have a stop surface which is provided to strike against the stop region of the tank wall. The stop region of the tank wall is structured to have a size (in area) that is greater or larger than the size (in area) of the stop surface of the lever sensor. The stop region of the tank wall comprises a surface which has a side length or diameter of no more than 20 mm, or no more than 10 mm.

In accordance with one or more embodiments, the stop surface of the lever sensor is arranged on a floating element of the lever sensor.

In accordance with one or more embodiments, the at least one stop surface or a plurality of stop surfaces is arranged on a tank wall of the tank device which is at the top in the installed position.

In accordance with one or more embodiments, the stop region of the tank wall has a plurality of structures protruded from the surface which reduce adhesion of the lever sensor to the tank in comparison with a smooth surface.

In accordance with one or more embodiments, the structures on the surface of the tank wall comprise elevations and/or depressions. For example, the structures on the surface of the tank wall may take the form of corrugations, channels, notches, grooves, ribs and/or knobs.

Additionally or alternatively, the stop region of the tank wall has at least one deformation towards the inside or towards the outside thereof. The at least one deformation comprises a curvature, in particular, a camber.

DRAWINGS

One or more embodiments will be illustrated by way of example in the drawings and explained in the description below.

DESCRIPTION

FIGS. 1 through 4 illustrate a tank device for a motor vehicle, in accordance with one or more embodiments.

Figure 2:
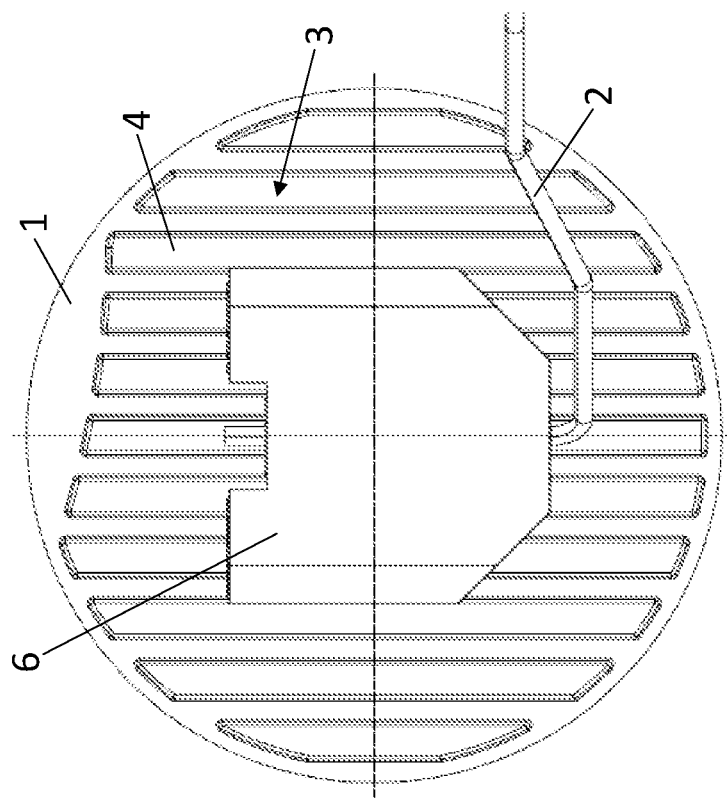
FIG. 2 illustrates a plan view from the inside of the stop region of the tank device of FIG. 1.
Figure 1:
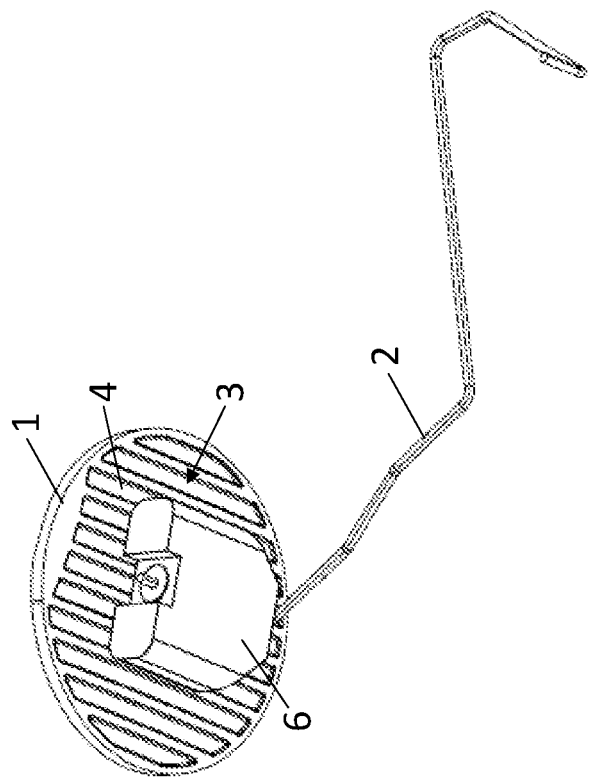
FIG. 1 illustrates a three-dimensional partial representation of a tank device, in accordance with one or more embodiments.

The illustrated example of FIG. 1 provides an overview of a segment of the interior of the tank device, which comprises a tank container formed or otherwise defined by a tank wall 1. Arranged in the interior of the tank is a lever sensor 2 to sense or determine a filling level in the tank container. The level sensor 2 is mounted on a floating element 6 or float arranged on the tank wall 1.

The tank wall 1 includes a stop region 3 arranged at a top or uppermost inner surface the tank, particularly in the installed position. The stop region 3 is formed integrally into the tank wall 1. At the stop region 3, the lever sensor 2 has a stop surface on the floating element 6 of the lever sensor 2. The stop region 3 of the tank wall 1 is structured to act as an end stop of the lever sensor 2, namely, for the floating element 6, and to prevent adhesion of the lever sensor 2 to the tank wall 1. For this purpose, the stop region 3 of the tank wall 1 has a plurality of structures on a surface thereof. In the illustrated embodiment, the structures comprise elevations and depressions in the form of corrugations or ribs 4.

Figure 4:
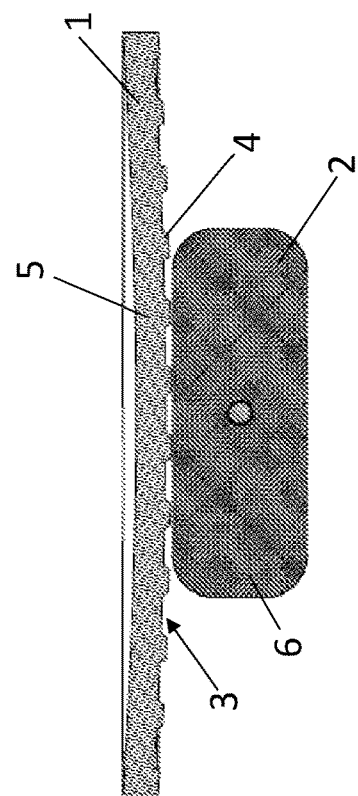
FIG. 4 illustrates a sectional view of the stop region of the tank device of FIG. 3.
Figure 3:
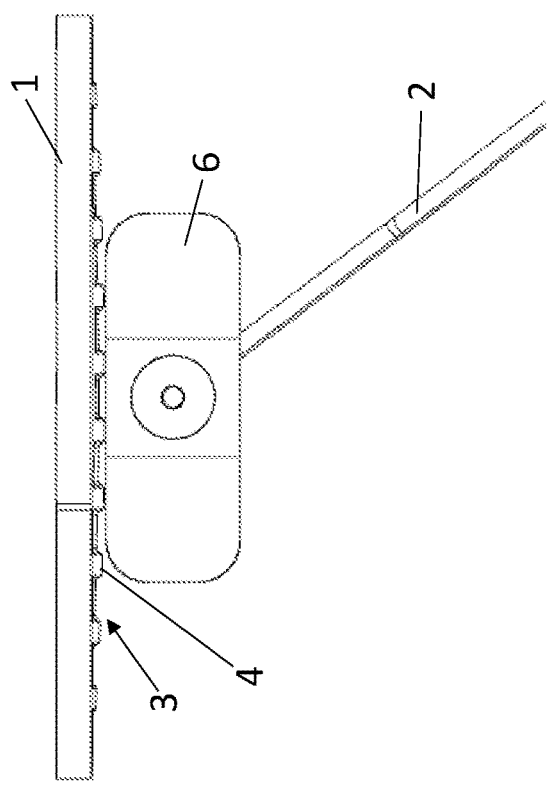
FIG. 3 illustrates a side view of the stop region of a tank device of FIG. 2.

As illustrated in FIGS. 3 and 4, the stop region 3 of the tank wall 1 is additionally structured having an inwardly directed curvature 5, i.e., a camber. The stop region 3 serves to prevent adhesion of the lever sensor 2 to the tank wall 1 without the need to secure an additional component on the tank wall for this purpose.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS

1 tank wall
2 lever sensor
3 stop region
4 ribs
5 curvature
6 floating element

What is claimed is:

1. A tank device for a motor vehicle, comprising:
a tank container defined by a tank wall having at least one stop region in an interior of the tank container, the at least one stop region having a plurality of structures on a surface thereof that are formed as corrugations; and
at least one lever sensor arranged in the interior of the tank container,
wherein the at least one stop region is an end stop for the lever sensor to prevent adhesion of the lever sensor to the tank wall.

2. The tank device of claim 1, wherein the structures comprise elevations and/or depressions.

3. The tank device of claim 1, wherein the at least one stop region comprises at least one deformation directed towards an inside of the tank wall or towards an outside of the tank wall.

4. The tank device of claim 1, wherein the at least one deformation comprises a camber.

5. The tank device of claim 1, wherein the stop region of the tank wall is formed located at a top of the tank wall in an installed position of the tank container.

6. The tank device of claim 1, further comprising a floating element arranged at one end of the lever sensor.

7. The tank device of claim 6, wherein the floating element is provided for abutment against the at least one stop region.

8. A tank device for a motor vehicle, comprising:
a tank container defined by a tank wall having at least one stop region formed integrally into the tank wall at an uppermost inner surface in an interior of the tank container, the at least one stop region having a plurality of structures on a surface thereof that include elevations and depressions formed as ribs;
a floating element in the interior of the tank container, the floating element having a stop surface for abutment against the at least one stop region; and
at least one lever sensor, extending from the floating element in the interior of the tank container,
wherein the at least one stop region is an end stop for the lever sensor to prevent adhesion of the lever sensor to the tank wall, the at least one stop region having a size that is greater than a size of the stop surface.

9. The tank device of claim 8, wherein the at least one stop region comprises at least one deformation directed towards an inside of the tank wall or towards an outside of the tank wall.

10. The tank device of claim 8, wherein the at least one deformation comprises a camber.

11. The tank device of claim 8, wherein the stop region of the tank wall is formed located at a top of the tank wall in an installed position of the tank container.

12. A motor vehicle, comprising:
a tank device including:
a tank container defined by a tank wall having at least one stop region formed integrally into the tank wall at an uppermost inner surface in an interior of the tank container, the at least one stop region having a plurality of structures on a surface thereof that include elevations and depressions formed as ribs;
a floating element in the interior of the tank container, the floating element having a stop surface for abutment against the at least one stop region; and
at least one lever sensor, extending from the floating element in the interior of the tank container,
wherein the at least one stop region is an end stop for the lever sensor to prevent adhesion of the lever sensor to the tank wall, the at least one stop region having a size that is greater than a size of the stop surface.

\* \* \* \* \*